United States Patent
Wang et al.

(10) Patent No.: US 11,610,328 B2
(45) Date of Patent: Mar. 21, 2023

(54) METHOD AND APPARATUS FOR IDENTIFYING ITEM

(71) Applicant: Beijing Baidu Netcom Science and Technology Co., Ltd., Beijing (CN)

(72) Inventors: Qingze Wang, Beijing (CN); Le Kang, Beijing (CN); Yingze Bao, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 128 days.

(21) Appl. No.: 16/861,293

(22) Filed: Apr. 29, 2020

(65) Prior Publication Data
US 2021/0035324 A1  Feb. 4, 2021

(30) Foreign Application Priority Data
Aug. 1, 2019 (CN) .......................... 201910707008.4

(51) Int. Cl.
*G06T 7/73* (2017.01)
*G06T 7/11* (2017.01)
(Continued)

(52) U.S. Cl.
CPC .............. *G06T 7/73* (2017.01); *G06N 20/00* (2019.01); *G06T 7/11* (2017.01); *G06V 10/443* (2022.01);
(Continued)

(58) Field of Classification Search
CPC ... G06T 7/73; G06T 7/11; G06T 2207/20081; G06K 9/00201; G06K 9/3233;
(Continued)

(56) References Cited

U.S. PATENT DOCUMENTS

2020/0293830 A1* 9/2020 Liu ..................... G06K 9/6259
2021/0012272 A1* 1/2021 Dugar ................... G06Q 10/10

FOREIGN PATENT DOCUMENTS

CN   108491825 A     9/2018
CN   108921811 A  * 11/2018  ............. G06K 9/627
(Continued)

OTHER PUBLICATIONS

Tonioni, Alessio, Eugenio Serra, and Luigi Di Stefano. "A deep learning pipeline for product recognition on store shelves." 2018 IEEE International Conference on Image Processing, Applications and Systems (IPAS). IEEE, 2018. (Year: 2018).*
(Continued)

*Primary Examiner* — Vu Le
*Assistant Examiner* — Tracy Mangialaschi
(74) *Attorney, Agent, or Firm* — Nixon Peabody LLP (57) ABSTRACT

Embodiments of the present disclosure provide a method and apparatus for identifying an item. The method includes: acquiring an item image of a to-be-identified item; setting initial position coordinates of the to-be-identified item on the item image; and executing following identifying: inputting the item image and the initial position coordinates into a pre-trained attention module to output an item feature of the to-be-identified item; inputting the item feature into a pre-trained long short-term memory network to output a predicted category and predicted position coordinates of the to-be-identified item; determining whether a preset condition is satisfied; and determining, in response to the preset condition being satisfied, a predicted category of the to-be-identified item outputted by the long short-term memory network a last time for use as a final category of the to-be-identified item.

13 Claims, 5 Drawing Sheets

(51) Int. Cl.
*G06N 20/00* (2019.01)
*G06V 10/44* (2022.01)
*G06V 20/64* (2022.01)

(52) U.S. Cl.
CPC .... *G06V 20/64* (2022.01); *G06T 2207/20081* (2013.01)

(58) Field of Classification Search
CPC .. G06K 9/4609; G06N 3/0445; G06N 3/0454; G06N 20/00; G06V 10/25; G06V 10/443; G06V 20/64
See application file for complete search history.

(56) References Cited

FOREIGN PATENT DOCUMENTS

| CN | 108921811 A | 11/2018 |
|---|---|---|
| CN | 109711463 A | 12/2018 |

OTHER PUBLICATIONS

Ba, Jimmy, Volodymyr Mnih, and Koray Kavukcuoglu. "Multiple object recognition with visual attention." arXiv preprint arXiv: 1412.7755v2 (2015). (Year: 2015).*

Zhao, Bo, et al. "Diversified visual attention networks for fine-grained object classification." IEEE Transactions on Multimedia 19.6 (2017): 1245-1256. (Year: 2017).*

* cited by examiner

METHOD AND APPARATUS FOR IDENTIFYING ITEM

CROSS-REFERENCE TO RELATED APPLICATIONS

This application claims priority to Chinese Patent Application No. 201910707008.4, filed on Aug. 1, 2019, titled "Method and apparatus for identifying item," which is hereby incorporated by reference in its entirety.

TECHNICAL FIELD

Embodiments of the present disclosure relate to the field of computer technology, and specifically to a method and apparatus for identifying an item.

BACKGROUND

With the development of artificial intelligence technology, the computer vision-based technology for identifying an item has also become increasingly widely used.

At present, identifying an entire image of an item image using a machine learning model is a common approach for identifying an item. However, due to camera angle or other reasons, a photographed item image will include not only a to-be-identified item, but also other items. When identifying the item, an existing machine learning model will generally treat all areas in the item image with equal importance. If other items are included in the item image, the other items will interfere with the identification, thereby resulting in a reduction in the identification accuracy.

SUMMARY

Embodiments of the present disclosure provides a method and apparatus for identifying an item.

In a first aspect, an embodiment of the present disclosure provides a method for identifying an item, including: acquiring an item image of a to-be-identified item; setting initial position coordinates of the to-be-identified item on the item image; and executing following identifying: inputting the item image and the initial position coordinates into a pre-trained attention module to output an item feature of the to-be-identified item; inputting the item feature into a pre-trained long short-term memory network to output a predicted category and predicted position coordinates of the to-be-identified item; determining whether a preset condition is satisfied; and determining, in response to the preset condition being satisfied, a predicted category of the to-be-identified item outputted by the long short-term memory network a last time for use as a final category of the to-be-identified item.

In some embodiments, the method further includes: using, in response to determining the preset condition not being satisfied, the predicted position coordinates of the to-be-identified item as the initial position coordinates, and continuing executing the identifying.

In some embodiments, the acquiring an item image of a to-be-identified item includes: acquiring a shelf image before a user takes or places the to-be-identified item from or on a shelf, and a shelf image after the user takes or places the to-be-identified item from or on the shelf; and comparing the shelf image before the user takes or places the to-be-identified item from or on the shelf, and the shelf image after the user takes or places the to-be-identified item from or on the shelf, to segment the item image of the to-be-identified item.

In some embodiments, the comparing the shelf image before the user takes or places the to-be-identified item from or on the shelf, and the shelf image after the user takes or places the to-be-identified item from or on the shelf, to segment the item image of the to-be-identified item includes: inputting the shelf image before the user takes or places the to-be-identified item from or on the shelf, and the shelf image after the user takes or places the to-be-identified item from or on the shelf into a pre-trained target detection model, to output position information of the to-be-identified item; and segmenting the item image of the to-be-identified item from the shelf image before the user takes or places the to-be-identified item from or on the shelf, or the shelf image after the user takes or places the to-be-identified item from or on the shelf based on the position information of the to-be-identified item.

In some embodiments, the preset condition includes: a number of iterations of executing the identifying being greater than or equal to a preset number of iterations.

In some embodiments, the preset number of iterations is determined by: acquiring a sample, wherein the sample includes a sample item image and a sample category tag of a sample item; setting initial sample position coordinates of the sample item on the sample item image; and executing following determining: inputting the sample item image and the initial sample position coordinates into the attention module, to output a sample item feature of the sample item; and inputting the sample item feature into the long short-term memory network, to output a predicted sample category and predicted sample position coordinates of the sample item; determining whether a duration of executing the determining exceeds a preset duration; determining an identification accuracy rate based on the predicted sample category and the sample category tag, in response to the duration of executing the determining failing to exceed the preset duration; determining whether the identification accuracy rate is not lower than a preset accuracy rate; and statisticizing, in response to the identification accuracy rate being not lower than the preset accuracy rate, a number of iterations of the determining, for use as the preset number of iterations.

In some embodiments, the determining the preset number of iterations further includes: using, in response to determining the identification accuracy rate being lower than the preset accuracy rate, the predicted sample position coordinates as the initial sample position coordinates, and continuing executing the determining.

In some embodiments, the determining the preset number of iterations further includes: statisticizing, in response to determining the duration of executing the determining exceeding the preset duration, a number of iterations of executing the determining, for use as the preset number of iterations.

In a second aspect, an embodiment of the present disclosure provides an apparatus for identifying an item, including: an acquiring unit configured to acquire an item image of a to-be-identified item; a setting unit configured to set initial position coordinates of the to-be-identified item on the item image; and an identifying unit configured to execute following identifying: inputting the item image and the initial position coordinates into a pre-trained attention module to output an item feature of the to-be-identified item; inputting the item feature into a pre-trained long short-term memory network to output a predicted category and predicted position coordinates of the to-be-identified item; determining whether a preset condition is satisfied; and determining, in response to the preset condition being satisfied, a predicted category of the to-be-identified item outputted by the long short-term memory network a last time for use as a final category of the to-be-identified item.

In some embodiments, the apparatus further includes: an executing unit configured to use, in response to determining the preset condition not being satisfied, the predicted position coordinates of the to-be-identified item as the initial position coordinates, and continue executing the identifying.

In some embodiments, the acquiring unit includes: an acquiring subunit configured to acquire a shelf image before a user takes or places the to-be-identified item from or on a shelf, and a shelf image after the user takes or places the to-be-identified item from or on the shelf; a segmenting subunit configured to compare the shelf image before the user takes or places the to-be-identified item from or on the shelf, and the shelf image after the user takes or places the to-be-identified item from or on the shelf, to segment the item image of the to-be-identified item.

In some embodiments, the segmenting subunit is further configured to: input the shelf image before the user takes or places the to-be-identified item from or on the shelf, and the shelf image after the user takes or places the to-be-identified item from or on the shelf into a pre-trained target detection model, to output position information of the to-be-identified item; and then segment the item image of the to-be-identified item from the shelf image before the user takes or places the to-be-identified item from or on the shelf, or the shelf image after the user takes or places the to-be-identified item from or on the shelf based on the position information of the to-be-identified item.

In some embodiments, the preset condition includes: the number of iterations of executing the identifying being not lower than a preset number of iterations.

In some embodiments, the preset number of iterations may be determined by: acquiring a sample, the sample including a sample item image and a sample category tag of a sample item; setting initial sample position coordinates of the sample item on the sample item image; and executing following determining: inputting the sample item image and the initial sample position coordinates into the attention module, to output a sample item feature of the sample item; and inputting the sample item feature into the long short-term memory network, to output a predicted sample category and predicted sample position coordinates of the sample item; determining whether a duration of executing the determining exceeds a preset duration; determining an identification accuracy rate based on the predicted sample category and the sample category tag, in response to the duration of executing the determining failing to exceed the preset duration; determining whether the identification accuracy rate is not lower than a preset accuracy rate; and statisticizing, in response to the identification accuracy rate being not lower than the preset accuracy rate, the number of iterations of the determining, for use as the preset number of iterations.

In some embodiments, the determining the preset number of iterations further includes: using, in response to determining the identification accuracy rate being lower than the preset accuracy rate, the predicted sample position coordinates as the initial sample position coordinates, and continuing executing the determining.

In some embodiments, the determining the preset number of iterations further includes: statisticizing, in response to determining the duration of executing the determining exceeding the preset duration, the number of iterations of executing the determining, for use as the preset number of iterations.

In a third aspect, an embodiment of the present disclosure provides an electronic device, including: one or more processors; and storage apparatus, storing one or more programs thereon, where the one or more programs, when executed by the one or more processors, cause the one or more processors to implement the method according to any implementation in the first aspect.

In a fourth aspect, an embodiment of the present disclosure provides a computer readable medium, storing a computer program thereon, where the computer program, when executed by a processor, implements the method according to any implementation in the first aspect.

The method and apparatus for identifying an item provided by embodiments of the present disclosure first acquires an item image of a to-be-identified item; then sets initial position coordinates of the to-be-identified item on the item image; and finally executes the following identifying: inputting the item image and the initial position coordinates into a pre-trained attention module to output an item feature of the to-be-identified item; inputting the item feature into a pre-trained long short-term memory network to output a predicted category and predicted position coordinates of the to-be-identified item; determining whether a preset condition is satisfied; and determining, in response to the preset condition being satisfied, a predicted category of the to-be-identified item outputted by the long short-term memory network a last time for use as a final category of the to-be-identified item. The attention module and the long short-term memory network are used for identifying the item image, and importance of different areas of the item image is distinguished by using different weights, such that the identification focus is concentrated on the to-be-identified item, thereby improving the accuracy in identifying an item.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

The present disclosure will be further described in detail below in combination with the accompanying drawings and the embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that some embodiments in the present disclosure and some features in the disclosure may be combined with each other on a non-conflict basis. The present disclosure will be described in detail below with reference to the accompanying drawings and in combination with the embodiments.

Figure 1:
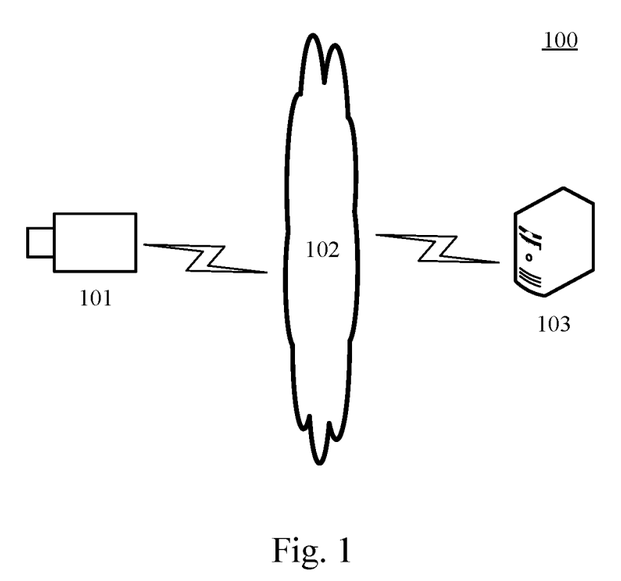
FIG. 1 is an example system architecture in which embodiments of the present disclosure may be implemented.

FIG. 1 shows an example system architecture 100 in which a method for identifying an item or an apparatus for identifying an item of an embodiment of the present disclosure may be implemented.

As shown in FIG. 1, the system architecture 100 may include a photographing device 101, a network 102, and a server 103. The network 102 serves as a medium providing a communication link between the photographing device 101 and the server 103. The network 102 may include various types of connections, such as wired or wireless communication links, or optical cables.

The photographing device 101 may interact with the server 103 via the network 102, for example, to receive or transmit a message. The photographing device 101 may be hardware or software. When the photographing device 101 is hardware, the photographing device may be various electronic devices that support image or video photographing functions, and include, but are not limited to, a camera lens, a camera, a smart phone, a tablet computer, and the like. When the photographing device 101 is software, the photographing device may be installed in the above electronic devices, or may be implemented as a plurality of software programs or software modules, or may be implemented as a single software program or software module. This is not specifically limited here.

The server 103 may provide various services. For example, the server 103 may process, e.g., analyze, acquired data of an item image of a to-be-identified item, and generate a processing result (for example, a final category of the to-be-identified item).

It should be noted that the server 103 may be hardware or software. When the server 103 is hardware, the server may be implemented as a distributed server cluster composed of a plurality of servers, or be implemented as a single server. When the server 103 is software, the server may be implemented as a plurality of software programs or software modules (e.g., software programs or software modules for providing distributed services), or may be implemented as a single software program or software module. This is not specifically limited here.

It should be noted that the method for identifying an item according to some embodiments of the present disclosure is generally executed by the server 103. Accordingly, the apparatus for identifying an item is generally provided in the server 103.

It should be understood that the numbers of photographing devices, networks, and servers in FIG. 1 are merely illustrative. Any number of photographing devices, networks, and servers may be provided based on actual requirements.

Figure 2:
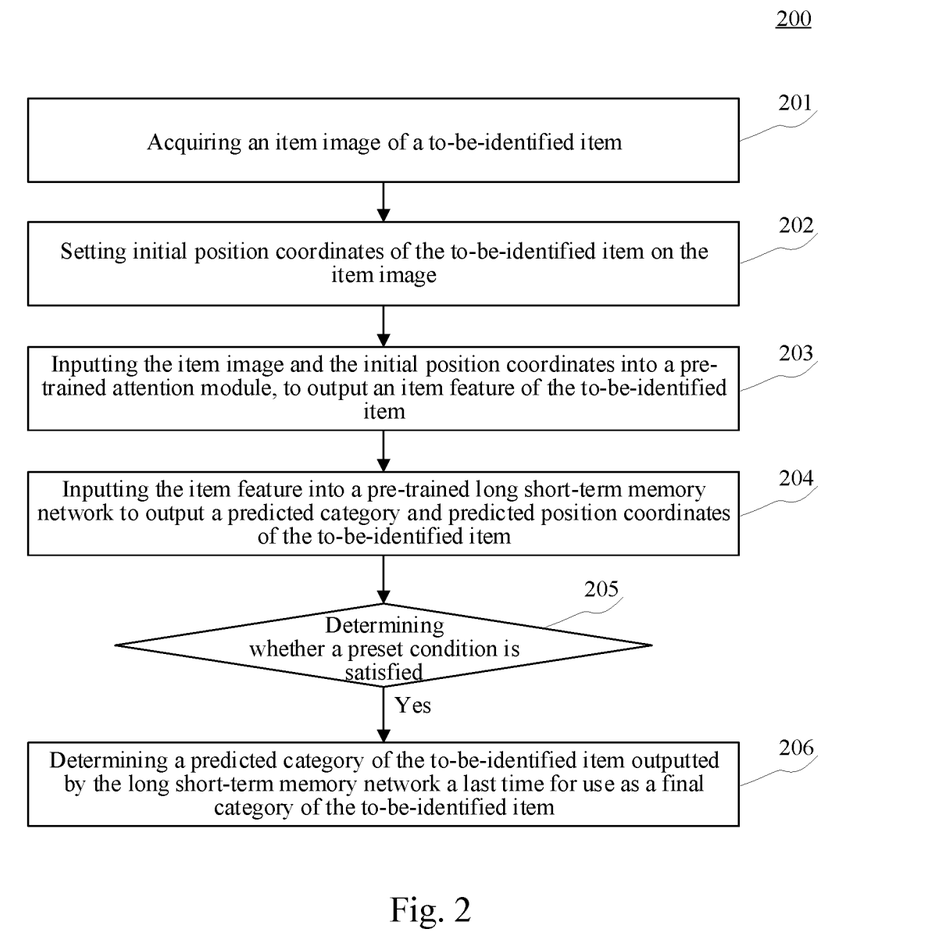
FIG. 2 is a flowchart of a method for identifying an item according to an embodiment of the present disclosure.

Further referring to FIG. 2, a process 200 of a method for identifying an item according to an embodiment of the present disclosure is shown. The method for identifying an item includes the following steps.

Step 201: acquiring an item image of a to-be-identified item.

In the present embodiment, an executing body (e.g., the server 103 shown in FIG. 1) of the method for identifying an item may acquire the item image of the to-be-identified item. The to-be-identified item may be any item among a large number of items placed on a shelf. The item image of the to-be-identified item may be an image obtained by photographing the to-be-identified item placed on the shelf. In some embodiments, a photographing device (e.g., the photographing device 101 shown in FIG. 1) may perform close-up photographing on the to-be-identified item placed on the shelf to obtain the item image of the to-be-identified item, and send the item image of the to-be-identified item to the executing body. In some embodiments, the photographing device may photograph the shelf on which to-be-identified item is placed to obtain a shelf image, and send the shelf image to the executing body. The executing body may segment the item image of the to-be-identified item from the shelf image.

It should be understood that since other items are also placed near the to-be-identified item, the item image of the to-be-identified item not only will include the to-be-identified item, but also will generally include a nearby item or a part of the nearby item.

Step 202: setting initial position coordinates of the to-be-identified item on the item image.

In the present embodiment, the executing body may set the initial position coordinates of the to-be-identified item on the item image. Generally, the executing body may pre-establish a rectangular coordinate system on the item image. Thus, the executing body may select any point on the item image, for use as an initial position of the to-be-identified item on the item image. Coordinates of the selected point in the rectangular coordinate system are the initial position coordinates of the to-be-identified item on the item image. For example, the executing body may establish the rectangular coordinate system with an upper left point of the item image as the origin, a rightward direction as the positive direction of the x axis, and a downward direction as the positive direction of the y axis.

Step 203: inputting the item image and the initial position coordinates into a pre-trained attention module, to output an item feature of the to-be-identified item.

In the present embodiment, the executing body may input the item image and the initial position coordinates into the pre-trained attention module. The attention module may extract the item feature of the to-be-identified item from the item image centered on a point indicated by the initial position coordinates. The attention module may be either hard attention or soft attention. Generally, the attention module will increase a weight of an area centered on the point indicated by the initial position coordinates on the item image, such that an identification focus is concentrated on the area centered on the point indicated by the initial position coordinates.

Step 204: inputting the item feature into a pre-trained long short-term memory network to output a predicted category and predicted position coordinates of the to-be-identified item.

In the present embodiment, the executing body may input the item feature into the pre-trained long short-term memory (LSTM) network, to output the predicted category and the predicted position coordinates of the to-be-identified item. Each unit of the long short-term memory network includes two word modules. A word module cls may be used for predicting a category. A word module loc may be used for predicting position coordinates. The predicted category of the to-be-identified item may be a category of the to-be-identified item predicted by the long short-term memory network. The predicted position coordinates of the to-beidentified item may be center position coordinates of the to-be-identified item predicted by the long short-term memory network.

Step 205: determining whether a preset condition is satisfied.

In the present embodiment, the executing body may determine whether the preset condition is satisfied, and execute step 206 in response to the preset condition being satisfied. The preset condition may be various pre-established conditions. For example, the preset condition may include the number of iterations of executing the identifying being greater than or equal to a preset number of iterations. For another example, the preset condition may include a duration of executing the identifying failing to exceed a preset duration.

Step 206: determining a predicted category of the to-be-identified item outputted by the long short-term memory network a last time for use as a final category of the to-be-identified item.

In the present embodiment, in response to the preset condition being satisfied, the executing body may determine the predicted category of the to-be-identified item outputted by the long short-term memory network the last time for use as the final category of the to-be-identified item.

The method for identifying an item provided by some embodiments of the present disclosure first acquires an item image of a to-be-identified item; then sets initial position coordinates of the to-be-identified item on the item image; and finally executes the following identifying: inputting the item image and the initial position coordinates into a pre-trained attention module to output an item feature of the to-be-identified item; inputting the item feature into a pre-trained long short-term memory network to output a predicted category and predicted position coordinates of the to-be-identified item; determining whether a preset condition is satisfied; and determining, in response to the preset condition being satisfied, a predicted category of the to-be-identified item outputted by the long short-term memory network a last time for use as a final category of the to-be-identified item. The attention module and the long short-term memory network are used for identifying the item image, and importance of different areas of the item image is distinguished by using different weights, such that the identification focus is concentrated on the to-be-identified item, thereby improving the accuracy in identifying an item.

Figure 3:
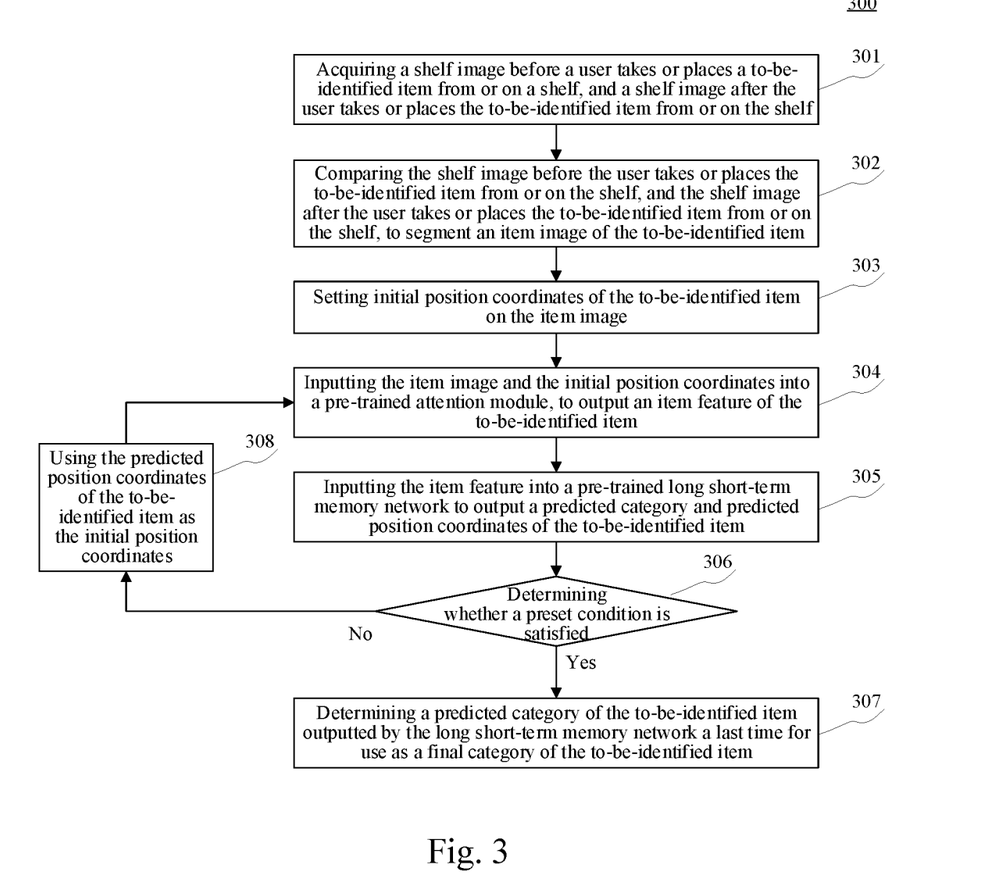
FIG. 3 is a flowchart of the method for identifying an item according to another embodiment of the present disclosure.

Further referring to FIG. 3, a process 300 of the method for identifying an item according to another embodiment of the present disclosure is shown. The method for identifying an item includes the following steps.

Step 301: acquiring a shelf image before a user takes or places a to-be-identified item from or on a shelf, and a shelf image after the user takes or places the to-be-identified item from or on the shelf.

In the present embodiment, an executing body (e.g., the server 103 shown in FIG. 1) of the method for identifying an item may acquire the shelf image before the user takes or places the to-be-identified item from or on the shelf, and the shelf image after the user takes or places the to-be-identified item from or on the shelf.

In practice, a photographing device may be provided above the shelf, the camera lens of the photographing device is directly facing the shelf, and is configured to photograph the shelf image of the shelf, and send the shelf image of the shelf to the executing body in real time. Further, a gravity sensor may be provided on the shelf, and is configured to collect gravity data on the shelf in real time, and send the gravity data to the executing body in real time. When the user takes or places an item from or on the shelf, the gravity data collected by the gravity sensor will change. The executing body may analyze the received gravity data in real time. When determining that the gravity data change, the executing body may acquire a shelf image before the gravity data change and a shelf image after the gravity data change. The shelf image before the gravity data change is the shelf image before the user takes or places the to-be-identified item from or on the shelf. The shelf image after the gravity data change is the shelf image after the user takes or places the to-be-identified item from or on the shelf.

Step 302: comparing the shelf image before the user takes or places the to-be-identified item from or on the shelf, and the shelf image after the user takes or places the to-be-identified item from or on the shelf, to segment an item image of the to-be-identified item.

In the present embodiment, the executing body may compare the shelf image before the user takes or places the to-be-identified item from or on the shelf, and the shelf image after the user takes or places the to-be-identified item from or on the shelf, to determine a difference therebetween, and segment the item image of the to-be-identified item based on the difference. If the user takes the to-be-identified item from the shelf, the shelf image before the user takes the to-be-identified item from the shelf will include the to-be-identified item. In this case, the executing body may segment the item image of the to-be-identified item from the shelf image before the user takes the to-be-identified item from the shelf. If the user places the to-be-identified item on the shelf, the shelf image after the user places the to-be-identified item on the shelf will include the to-be-identified item. In this case, the executing body may segment the item image of the to-be-identified item from the shelf image after the user places the to-be-identified item on the shelf.

In some alternative implementations of the present embodiment, the executing body may first input the shelf image before the user takes or places the to-be-identified item from or on the shelf, and the shelf image after the user takes or places the to-be-identified item from or on the shelf into a pre-trained target detection model, to output position information of the to-be-identified item; and then segment the item image of the to-be-identified item from the shelf image before the user takes or places the to-be-identified item from or on the shelf or the shelf image after the user takes or places the to-be-identified item from or on the shelf based on the position information of the to-be-identified item. The target detection model may be configured to detect an item position, including but not limited to SSD, R-CNN, Fast R-CNN, Faster R-CNN, YOLO, and so on.

Step 303: setting initial position coordinates of the to-be-identified item on the item image.

Step 304: inputting the item image and the initial position coordinates into a pre-trained attention module, to output an item feature of the to-be-identified item.

Step 305: inputting the item feature into a pre-trained long short-term memory network to output a predicted category and predicted position coordinates of the to-be-identified item.

Step 306: determining whether a preset condition is satisfied.

Step 307: determining a predicted category of the to-be-identified item outputted by the long short-term memory network a last time for use as a final category of the to-be-identified item.

In the present embodiment, specific operations of steps 303-307 have been introduced in detail in steps 202-206 in the embodiment shown in FIG. 2. The description will not be repeated here.

Step 308: using the predicted position coordinates of the to-be-identified item as the initial position coordinates.

In the present embodiment, in response to determining the preset condition not being satisfied, the executing body may use the predicted position coordinates of the to-be-identified item as the initial position coordinates, and return to continue executing step 304. The operation of identifying is iteratively executed in this way, until the condition is satisfied, and the final category of the to-be-identified item is determined.

As can be seen from FIG. 3, compared with the corresponding embodiment of FIG. 2, the process 300 of the method for identifying an item in the present embodiment additionally provides the operation of iteratively identifying. Therefore, the solution described in the present embodiment iteratively identifies the item image repeatedly using the attention module and the long short-term memory network, such that the initial position coordinates inputted into the attention module are getting closer to a center of the to-be-identified item, thereby further improving the accuracy in identifying an item. In addition, the to-be-identified item is an item taken from or placed on the shelf by the user, such that the method for identifying an item in the present embodiment can be applied to the field of unmanned retail, thereby reducing the labor costs.

Figure 4:
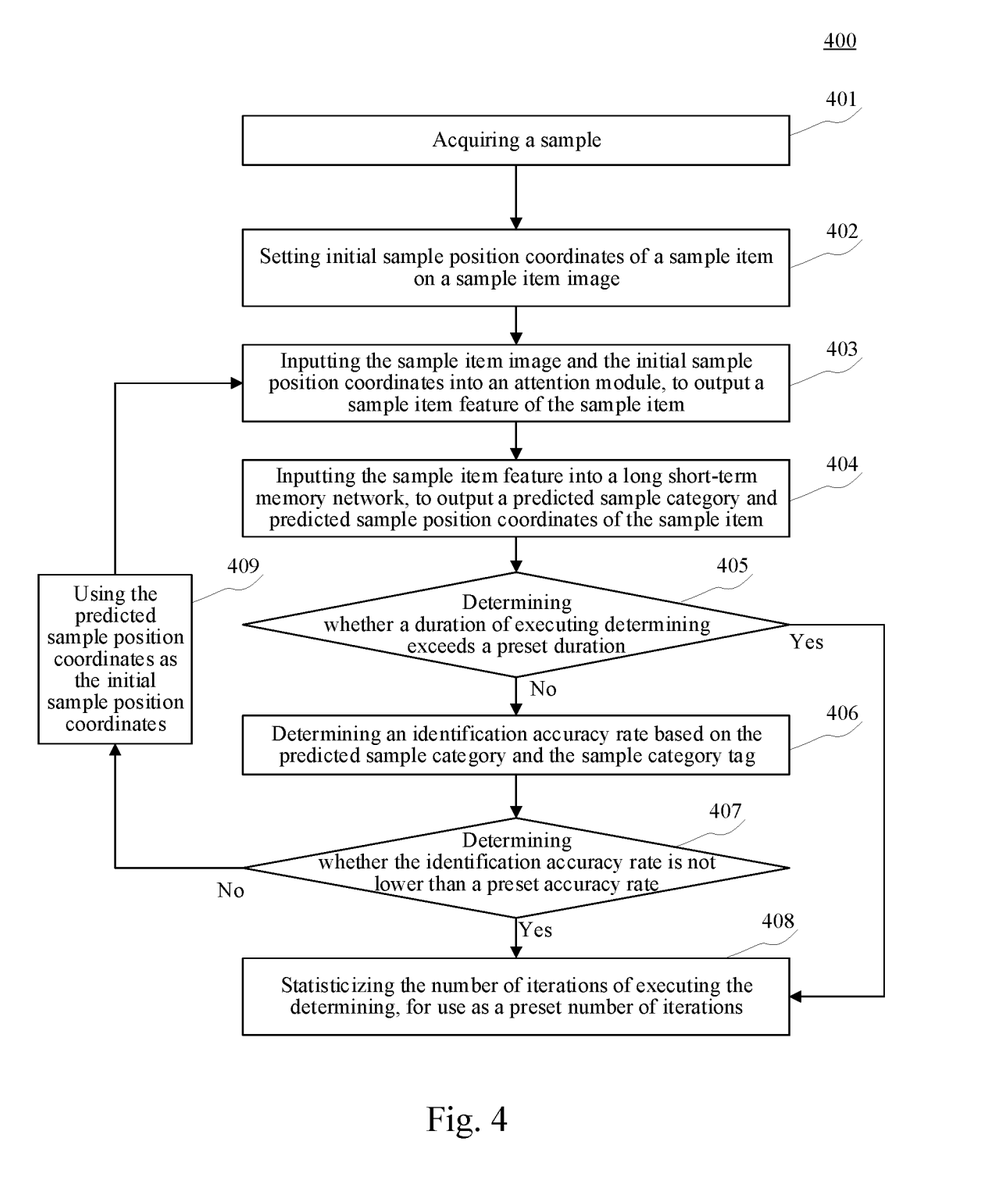
FIG. 4 is a flowchart of a method for determining a preset number of iterations according to an embodiment of the present disclosure.

Further referring to FIG. 4, a process 400 of a method for determining a preset number of iterations according to an embodiment of the present disclosure is shown. The method for determining a preset number of iterations includes the following steps.

Step 401: acquiring a sample.

In the present embodiment, an executing body (e.g., the server 103 shown in FIG. 1) of the method for determining a preset number of iterations may acquire a large number of samples. Each sample may include a sample item image and a sample category tag of each sample item.

Step 402: setting initial sample position coordinates of a sample item on a sample item image.

In the present embodiment, the executing body may set the initial sample position coordinates of the sample item on the sample item image. Generally, the executing body may pre-establish a rectangular coordinate system on the sample item image. Thus, the executing body may select any point on the sample item image, for use as an initial sample position of the sample item on the sample item image. Coordinates of the selected point in the rectangular coordinate system are the initial sample position coordinates of the sample item on the sample item image.

Step 403: inputting the sample item image and the initial sample position coordinates into an attention module, to output a sample item feature of the sample item.

In the present embodiment, the executing body may input the sample item image and the initial sample position coordinates into the attention module. The attention module may extract the sample item feature of the sample item from the sample item image centered on a position indicated by the initial sample position coordinates.

Step 404: inputting the sample item feature into a long short-term memory network, to output a predicted sample category and predicted sample position coordinates of the sample item.

In the present embodiment, the executing body may input the sample item feature into the long short-term memory network, to output the predicted sample category and the predicted sample position coordinates of the sample item. Each unit of the long short-term memory network includes two word modules. A word module cls may be used for predicting a category. A word module loc may be used for predicting position coordinates. The predicted sample category of the sample item may be a category of the sample item predicted by the long short-term memory network. The predicted sample position coordinates of the sample item may be center position coordinates of the sample item predicted by the long short-term memory network.

Step 405: determining whether a duration of executing determining exceeds a preset duration.

In the present embodiment, the executing body may acquire the duration of executing the determining, and compare the duration of executing the determining with the preset duration. Step 406 is executed, in response to the duration of executing the determining failing to exceed the preset duration; and step 408 is executed, in response to the duration of executing the determining exceeding the preset duration.

Step 406: determining an identification accuracy rate based on the predicted sample category and the sample category tag.

In the present embodiment, in the case where the duration of executing the determining fails to exceed the preset duration, the executing body may determine the identification accuracy rate based on the predicted sample category and the sample category tag. Specifically, the executing body may first statisticize the number of predicted sample categories consistent with corresponding sample category tags, to determine the number of correctly predicted sample categories; and then compute a ratio of the number of correctly predicted sample categories to the number of samples, to obtain the identification accuracy rate.

Step 407: determining whether the identification accuracy rate is higher than or equal to a preset accuracy rate.

In the present embodiment, the executing body may compare the identification accuracy rate with the preset accuracy rate. Step 408 is executed, in response to the identification accuracy rate being not lower than the preset accuracy rate; and step 409 is executed, in response to the identification accuracy rate being lower than the preset accuracy rate.

Step 408: statisticizing the number of iterations of executing the determining, for use as a preset number of iterations.

In the present embodiment, in the case where the duration of executing the determining exceeds the preset duration or the identification accuracy rate is not lower than the preset accuracy rate, the executing body may statisticize the number of iterations of executing the determining, for use as the preset number of iterations.

Step 409: using the predicted sample position coordinates as the initial sample position coordinates.

In the present embodiment, in the case where the identification accuracy rate is lower than the preset accuracy rate, the executing body may use the predicted sample position coordinates as the initial sample position coordinates, and return to execute step 403. The determining is iteratively executed in this way, until determining that the duration of executing the determining exceeds the preset duration or the identification accuracy rate is not lower than the preset accuracy rate, and determining the preset number of iterations.

The method for determining a preset number of iterations provided by some embodiments of the present disclosure considers both the identification effects and the identification duration, thereby not only ensuring good identification effects, but also ensuring that the identification duration will not be very long.

Figure 5:
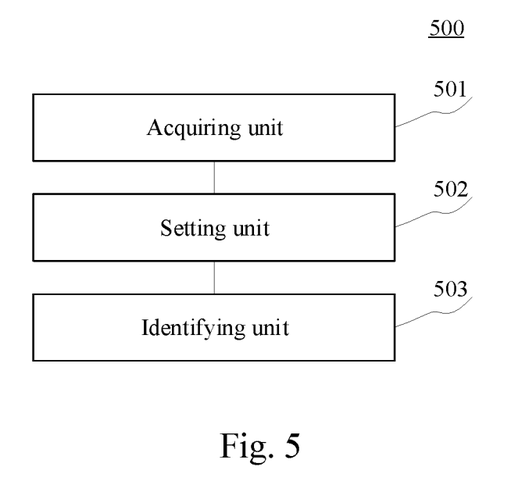
FIG. 5 is a schematic structural diagram of an apparatus for identifying an item according to an embodiment of the present disclosure.

Further referring to FIG. 5, as an implementation of the method shown in the above figures, an embodiment of the present disclosure provides an apparatus for identifying an item. The embodiment of the apparatus corresponds to the embodiment of the method shown in FIG. 2. The apparatus may be specifically applied to various electronic devices.

As shown in FIG. 5, the apparatus 500 for identifying an item of the present embodiment may include: an acquiring unit 501, a setting unit 502, and an identifying unit 503. The acquiring unit 501 is configured to acquire an item image of a to-be-identified item; the setting unit 502 is configured to set initial position coordinates of the to-be-identified item on the item image; and the identifying unit 503 is configured to execute the following identifying: inputting the item image and the initial position coordinates into a pre-trained attention module to output an item feature of the to-be-identified item; inputting the item feature into a pre-trained long short-term memory network to output a predicted category and predicted position coordinates of the to-be-identified item; determining whether a preset condition is satisfied; and determining, in response to the preset condition being satisfied, a predicted category of the to-be-identified item outputted by the long short-term memory network a last time for use as a final category of the to-be-identified item.

The specific processing of the acquiring unit 501, the setting unit 502, and the identifying unit 503 of the apparatus 500 for identifying an item and the technical effects thereof in the present embodiment may be refer to the related description of step 201, step 202, and steps 203-206 in the corresponding embodiment of FIG. 2, respectively. The description will not be repeated here.

In some alternative implementations of the present embodiment, the apparatus 500 for identifying an item further includes: an executing unit (not shown in the figure) configured to use, in response to determining the preset condition not being satisfied, the predicted position coordinates of the to-be-identified item as the initial position coordinates, and continue executing the identifying.

In some alternative implementations of the present embodiment, the acquiring unit 501 includes: an acquiring subunit (not shown in the figure) configured to acquire a shelf image before a user takes or places the to-be-identified item from or on a shelf, and a shelf image after the user takes or places the to-be-identified item from or on the shelf; a segmenting subunit (not shown in the figure) configured to compare the shelf image before the user takes or places the to-be-identified item from or on the shelf, and the shelf image after the user takes or places the to-be-identified item from or on the shelf, to segment the item image of the to-be-identified item.

In some alternative implementations of the present embodiment, the segmenting subunit is further configured to: input the shelf image before the user takes or places the to-be-identified item from or on the shelf, and the shelf image after the user takes or places the to-be-identified item from or on the shelf into a pre-trained target detection model, to output position information of the to-be-identified item; and then segment the item image of the to-be-identified item from the shelf image before the user takes or places the to-be-identified item from or on the shelf, or the shelf image after the user takes or places the to-be-identified item from or on the shelf based on the position information of the to-be-identified item.

In some alternative implementations of the present embodiment, the preset condition includes: the number of iterations of executing the identifying being not lower than a preset number of iterations.

In some alternative implementations of the present embodiment, the preset number of iterations may be determined by: acquiring a sample, the sample including a sample item image and a sample category tag of a sample item; setting initial sample position coordinates of the sample item on the sample item image; and executing following determining: inputting the sample item image and the initial sample position coordinates into the attention module, to output a sample item feature of the sample item; and inputting the sample item feature into the long short-term memory network, to output a predicted sample category and predicted sample position coordinates of the sample item; determining whether a duration of executing the determining exceeds a preset duration; determining an identification accuracy rate based on the predicted sample category and the sample category tag, in response to the duration of executing the determining failing to exceed the preset duration; determining whether the identification accuracy rate is not lower than a preset accuracy rate; and statisticizing, in response to the identification accuracy rate being not lower than the preset accuracy rate, the number of iterations of the determining, for use as the preset number of iterations.

In some alternative implementations of the present embodiment, the determining the preset number of iterations further includes: using, in response to determining the identification accuracy rate being lower than the preset accuracy rate, the predicted sample position coordinates as the initial sample position coordinates, and continuing executing the determining.

In some alternative implementations of the present embodiment, the determining the preset number of iterations further includes: statisticizing, in response to determining the duration of executing the determining exceeding the preset duration, the number of iterations of executing the determining, for use as the preset number of iterations.

Figure 6:
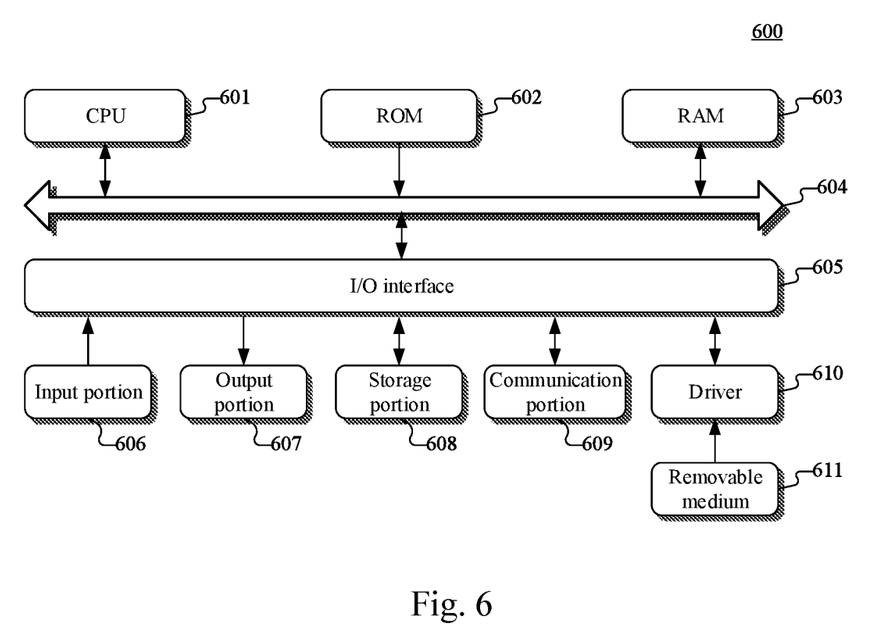
FIG. 6 is a schematic structural diagram of a computer system adapted to implement an electronic device of the embodiments of the present disclosure.

Referring to FIG. 6, a schematic structural diagram of a computer system 600 of an electronic device (such as the server 103 as shown in FIG. 1) adapted to implement the embodiments of the present disclosure is shown. The electronic device shown in FIG. 6 is merely an example, and should not limit the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 505 is also connected to the bus 604.

The following components are connected to the I/O interface 605: an input portion 606 including a touch screen, touch pad, keyboard, mouse, camera, microphone, accelerometer, gyroscope and the like; an output portion 607 including a liquid crystal display (LCD), a speaker, a vibrator and the like; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 510, so that a computer program read therefrom is installed on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication portion 609, and/or may be installed from the removable media 611. The computer program, when executed by the CPU 601, implements the functions as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in some embodiments of the present disclosure may be implemented by software or may be implemented by hardware. The described units may also be provided in a processor, for example, described as: a processor including an acquiring unit, a setting unit, and an identifying unit. The names of the units do not constitute a limitation to such units themselves in this case. For example, the acquiring unit may be further described as "a unit configured to acquire an item image of a to-be-identified item."

In another aspect, an embodiment of the present disclosure further provides a computer readable medium. The computer readable medium may be included in the electronic device described in the above embodiments, or a stand-alone computer readable medium without being assembled into the electronic device. The computer readable medium stores one or more programs. The one or more programs, when executed by the electronic device, cause the electronic device to: acquire an item image of a to-be-identified item; set initial position coordinates of the to-be-identified item on the item image; and execute following identifying: inputting the item image and the initial position coordinates into a pre-trained attention module to output an item feature of the to-be-identified item; inputting the item feature into a pre-trained long short-term memory network to output a predicted category and predicted position coordinates of the to-be-identified item; determining whether a preset condition is satisfied; and determining, in response to the preset condition being satisfied, a predicted category of the to-be-identified item outputted by the long short-term memory network a last time for use as a final category of the to-be-identified item.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for identifying an item, comprising:
acquiring an item image of a to-be-identified item;
selecting one point on the item image, and using coordinates of the selected point in a pre-established rectangular coordinate system on the item image as initial position coordinates of the to-be-identified item on the item image; and
executing following identifying: inputting the item image and the initial position coordinates into a pre-trained attention module to output an item feature of the to-be-identified item, wherein the attention module increases a weight of an area centered on the selected point indicated by the initial position coordinates on the item image, such that an identification focus is concentrated on the area centered on the point indicated by the initial position coordinates; inputting the item feature into a pre-trained long short-term memory network to output a predicted category and predicted position coordinates of the to-be-identified item; and determining, in response to determining that a number of iterations of executing the identifying is greater than or equal to a preset number of iterations, a predicted category of the to-be-identified item outputted by the long short-term memory network a last time for use as a final category of the to-be-identified item;
wherein the method further comprises:
using, in response to determining that the number of iterations of executing the identifying is less than the preset number of iterations, the predicted position coordinates of the to-be-identified item as the initial position coordinates, and continuing executing the identifying until the number of iterations of executing the identifying being greater than or equal to the preset number of iterations.

2. The method according to claim 1, wherein the acquiring an item image of a to-be-identified item comprises:
acquiring a shelf image before a user takes or places the to-be-identified item from or on a shelf, and a shelf image after the user takes or places the to-be-identified item from or on the shelf; and
comparing the shelf image before the user takes or places the to-be-identified item from or on the shelf, and the shelf image after the user takes or places the to-be-identified item from or on the shelf, to segment the item image of the to-be-identified item.

3. The method according to claim 2, wherein the comparing the shelf image before the user takes or places the to-be-identified item from or on the shelf, and the shelf image after the user takes or places the to-be-identified item from or on the shelf, to segment the item image of the to-be-identified item comprises:
inputting the shelf image before the user takes or places the to-be-identified item from or on the shelf, and the shelf image after the user takes or places the to-be-identified item from or on the shelf into a pre-trained target detection model, to output position information of the to-be-identified item; and
segmenting the item image of the to-be-identified item from the shelf image before the user takes or places the to-be-identified item from or on the shelf, or the shelf image after the user takes or places the to-be-identified item from or on the shelf based on the position information of the to-be-identified item.

4. The method according to claim 1, wherein the preset number of iterations is determined by:
acquiring a sample, wherein the sample includes a sample item image and a sample category tag of a sample item;
setting initial sample position coordinates of the sample item on the sample item image; and
executing following determining: inputting the sample item image and the initial sample position coordinates into the attention module, to output a sample item feature of the sample item; and inputting the sample item feature into the long short-term memory network, to output a predicted sample category and predicted sample position coordinates of the sample item; determining whether a duration of executing the determining exceeds a preset duration; determining an identification accuracy rate based on the predicted sample category and the sample category tag, in response to the duration of executing the determining failing to exceed the preset duration; determining whether the identification accuracy rate is not lower than a preset accuracy rate; and statisticizing, in response to the identification accuracy rate being not lower than the preset accuracy rate, a number of iterations of the determining, for use as the preset number of iterations.

5. The method according to claim 4, wherein the determining the preset number of iterations further comprises:
using, in response to determining the identification accuracy rate being lower than the preset accuracy rate, the predicted sample position coordinates as the initial sample position coordinates, and continuing executing the determining.

6. The method according to claim 5, wherein the determining the preset number of iterations further comprises:
statisticizing, in response to determining the duration of executing the determining exceeding the preset duration, a number of iterations of executing the determining, for use as the preset number of iterations.

7. A non-transitory computer readable medium, storing a computer program thereon, wherein the computer program, when executed by a processor, implements the method according to claim 1.

8. An apparatus for identifying an item, comprising:
at least one processor; and
a memory storing instructions, wherein the instructions when executed by the at least one processor, cause the at least one processor to perform operations, the operations comprising:
acquiring an item image of a to-be-identified item;
selecting one point on the item image, and using coordinates of the selected point in a pre-established rectangular coordinate system on the item image as initial position coordinates of the to-be-identified item on the item image; and
executing following identifying: inputting the item image and the initial position coordinates into a pre-trained attention module to output an item feature of the to-be-identified item, wherein the attention module increases a weight of an area centered on the point indicated by the initial position coordinates on the item image, such that an identification focus is concentrated on the area centered on the point indicated by the initial position coordinates; inputting the item feature into a pre-trained long short-term memory network to output a predicted category and predicted position coordinates of the to-be-identified item; and determining, in response to determining that a number of iterations of executing the identifying is greater than or equal to a preset number of iterations, a predicted category of the to-be-identified item outputted by the long short-term memory network a last time for use as a final category of the to-be-identified item;

wherein the operations further comprise:

using, in response to determining that the number of iterations of executing the identifying is less than the preset number of iterations, the predicted position coordinates of the to-be-identified item as the initial position coordinates, and continuing executing the identifying until the number of iterations of executing the identifying being greater than or equal to the preset number of iterations.

9. The apparatus according to claim 8, wherein the acquiring an item image of a to-be-identified item comprises:

acquiring a shelf image before a user takes or places the to-be-identified item from or on a shelf, and a shelf image after the user takes or places the to-be-identified item from or on the shelf; and comparing the shelf image before the user takes or places the to-be-identified item from or on the shelf, and the shelf image after the user takes or places the to-be-identified item from or on the shelf, to segment the item image of the to-be-identified item.

10. The apparatus according to claim 9, wherein the comparing the shelf image before the user takes or places the to-be-identified item from or on the shelf, and the shelf image after the user takes or places the to-be-identified item from or on the shelf, to segment the item image of the to-be-identified item comprises:

inputting the shelf image before the user takes or places the to-be-identified item from or on the shelf, and the shelf image after the user takes or places the to-be-identified item from or on the shelf into a pre-trained target detection model, to output position information of the to-be-identified item; and segmenting the item image of the to-be-identified item from the shelf image before the user takes or places the to-be-identified item from or on the shelf, or the shelf image after the user takes or places the to-be-identified item from or on the shelf based on the position information of the to-be-identified item.

11. The apparatus according to claim 8, wherein the preset number of iterations is determined by:

acquiring a sample, wherein the sample includes a sample item image and a sample category tag of a sample item;

setting initial sample position coordinates of the sample item on the sample item image; and executing following determining: inputting the sample item image and the initial sample position coordinates into the attention module, to output a sample item feature of the sample item; and inputting the sample item feature into the long short-term memory network, to output a predicted sample category and predicted sample position coordinates of the sample item; determining whether a duration of executing the determining exceeds a preset duration; determining an identification accuracy rate based on the predicted sample category and the sample category tag, in response to the duration of executing the determining failing to exceed the preset duration; determining whether the identification accuracy rate is not lower than a preset accuracy rate; and statisticizing, in response to the identification accuracy rate being not lower than the preset accuracy rate, a number of iterations of the determining, for use as the preset number of iterations.

12. The apparatus according to claim 11, wherein the determining the preset number of iterations further comprises:

using, in response to determining the identification accuracy rate being lower than the preset accuracy rate, the predicted sample position coordinates as the initial sample position coordinates, and continuing executing the determining.

13. The apparatus according to claim 12, wherein the determining the preset number of iterations further comprises:

statisticizing, in response to determining the duration of executing the determining exceeding the preset duration, a number of iterations of executing the determining, for use as the preset number of iterations.

* * * * *